United States Patent
Kislitsin

(10) Patent No.: US 10,581,880 B2
(45) Date of Patent: Mar. 3, 2020

(54) SYSTEM AND METHOD FOR GENERATING RULES FOR ATTACK DETECTION FEEDBACK SYSTEM

(71) Applicant: GROUP-IB TDS LTD., Moscow (RU)

(72) Inventor: Nikita Igorevich Kislitsin, Moscow (RU)

(73) Assignee: GROUP-IB TDS LTD., Moscow (RU)

( * ) Notice: Subject to any disclaimer, the term of this patent is extended or adjusted under 35 U.S.C. 154(b) by 0 days.

(21) Appl. No.: 15/707,641

(22) Filed: Sep. 18, 2017

(65) Prior Publication Data

US 2018/0083987 A1 Mar. 22, 2018

(30) Foreign Application Priority Data

Sep. 19, 2016 (RU) .............................. 2016137336 U

(51) Int. Cl.
*H04L 29/06* (2006.01)
*G06F 21/55* (2013.01)
*G06F 21/57* (2013.01)

(52) U.S. Cl.
CPC ........ *H04L 63/1416* (2013.01); *G06F 21/552* (2013.01); *H04L 63/1408* (2013.01);
(Continued)

(58) Field of Classification Search
CPC ............. H04L 63/1416; H04L 63/1408; H04L 63/1425; H04L 63/1433; G06F 21/552
(Continued)

(56) References Cited

U.S. PATENT DOCUMENTS 7,496,628 B2 2/2009 Arnold et al.
7,712,136 B2 5/2010 Sprosts et al.
(Continued)

FOREIGN PATENT DOCUMENTS

CN 103491205 A 1/2014
CN 104504307 A 4/2015
(Continued)

OTHER PUBLICATIONS

Whyte, "DNS-based Detection of Scanning Worms in an Enterprise Network", Aug. 2004, NDSS, pp. 1-17 (Year: 2005).*
(Continued)

*Primary Examiner* — Alexander Lagor
*Assistant Examiner* — Gregory A Lane
(74) *Attorney, Agent, or Firm* — BCF LLP

(57) ABSTRACT

There is provided a method for auto-generation of decision rules for attack detection feedback systems. The method is executed on a server. The method comprises: receiving at least one event from an event database, the event database having been generated from data obtained by at least one sensor; analyzing the at least one event to determine whether the at least one event belongs to a class of malware control center interactions; if the at least one event belongs to the class of malware control center interactions, extracting at least one attribute from the at least one event; generating decision rules using the at least one attribute; and saving the decision rules; saving the decision rules, the decision rules being instrumental in updating what type of further data is obtained by the at least one sensor based on the decision rule.

14 Claims, 3 Drawing Sheets

(52) U.S. Cl.
CPC ...... *H04L 63/1425* (2013.01); *H04L 63/1433* (2013.01); *G06F 21/57* (2013.01); *H04L 63/1441* (2013.01)

(58) Field of Classification Search
USPC .......................................................... 726/22
See application file for complete search history.

(56) References Cited

U.S. PATENT DOCUMENTS

| | | | |
|---|---|---|---|
| 7,730,040 B2 | 6/2010 | Reasor et al. | |
| 7,865,953 B1 | 1/2011 | Hsieh et al. | |
| 7,958,555 B1 | 6/2011 | Chen et al. | |
| 7,984,500 B1 | 7/2011 | Khanna et al. | |
| 8,132,250 B2 | 3/2012 | Judge et al. | |
| 8,151,341 B1 | 4/2012 | Gudov | |
| 8,260,914 B1 | 9/2012 | Ranjan | |
| 8,402,543 B1 | 3/2013 | Ranjan et al. | |
| 8,448,245 B2 | 5/2013 | Banerjee et al. | |
| 8,532,382 B1 | 9/2013 | Ioffe | |
| 8,539,582 B1 | 9/2013 | Aziz et al. | |
| 8,555,388 B1 | 10/2013 | Wang et al. | |
| 8,561,177 B1 | 10/2013 | Aziz et al. | |
| 8,600,993 B1 | 12/2013 | Gupta et al. | |
| 8,612,463 B2 | 12/2013 | Brdiczka et al. | |
| 8,625,033 B1 | 1/2014 | Marwood et al. | |
| 8,635,696 B1 | 1/2014 | Aziz | |
| 8,650,080 B2 | 2/2014 | O'Connell et al. | |
| 8,660,296 B1 | 2/2014 | Ioffe | |
| 8,677,472 B1 | 3/2014 | Dotan et al. | |
| 8,776,229 B1 | 7/2014 | Aziz | |
| 8,850,571 B2 | 9/2014 | Staniford et al. | |
| 8,856,937 B1 | 10/2014 | Wüest et al. | |
| 8,972,412 B1 | 3/2015 | Christian et al. | |
| 9,060,018 B1 | 6/2015 | Yu et al. | |
| 9,210,111 B2 | 12/2015 | Chasin et al. | |
| 9,215,239 B1 | 12/2015 | Wang et al. | |
| 9,253,208 B1 | 2/2016 | Koshelev | |
| 9,330,258 B1 | 5/2016 | Satish et al. | |
| 9,456,000 B1 | 9/2016 | Spiro et al. | |
| 9,723,344 B1 | 8/2017 | Granström et al. | |
| 9,736,178 B1 | 8/2017 | Ashley | |
| 9,917,852 B1* | 3/2018 | Xu | H04L 63/1416 |
| 9,934,376 B1* | 4/2018 | Ismael | G06F 9/45558 |
| 2002/0161862 A1 | 10/2002 | Horvitz | |
| 2003/0009696 A1* | 1/2003 | Bunker V. | H04L 43/00 726/26 |
| 2006/0074858 A1 | 4/2006 | Etzold et al. | |
| 2006/0107321 A1 | 5/2006 | Tzadikario | |
| 2006/0224898 A1 | 10/2006 | Ahmed | |
| 2009/0138342 A1 | 5/2009 | Otto et al. | |
| 2010/0037314 A1 | 2/2010 | Perdisci et al. | |
| 2010/0076857 A1 | 3/2010 | Deo et al. | |
| 2010/0115621 A1 | 5/2010 | Staniford et al. | |
| 2010/0191737 A1 | 7/2010 | Friedman et al. | |
| 2010/0205665 A1 | 8/2010 | Komili et al. | |
| 2011/0222787 A1 | 9/2011 | Thiemert et al. | |
| 2012/0030293 A1 | 2/2012 | Bobotek | |
| 2012/0079596 A1 | 3/2012 | Thomas et al. | |
| 2012/0087583 A1 | 4/2012 | Yang et al. | |
| 2012/0158626 A1 | 6/2012 | Zhu et al. | |
| 2012/0233656 A1* | 9/2012 | Rieschick | H04L 63/1441 726/1 |
| 2012/0291125 A1 | 11/2012 | Maria | |
| 2013/0086677 A1 | 4/2013 | Ma et al. | |
| 2013/0103666 A1 | 4/2013 | Sandberg et al. | |
| 2013/0111591 A1 | 5/2013 | Topan et al. | |
| 2013/0117848 A1 | 5/2013 | Golshan et al. | |
| 2013/0191364 A1 | 7/2013 | Kamel et al. | |
| 2013/0263264 A1 | 10/2013 | Klein et al. | |
| 2013/0297619 A1 | 11/2013 | Chandrasekaran et al. | |
| 2013/0340080 A1 | 12/2013 | Gostev et al. | |
| 2014/0033307 A1 | 1/2014 | Schmidtler | |
| 2014/0058854 A1 | 2/2014 | Ranganath et al. | |
| 2014/0082730 A1* | 3/2014 | Vashist | H04L 63/1416 726/23 |
| 2014/0173287 A1 | 6/2014 | Mizunuma | |
| 2014/0310811 A1* | 10/2014 | Hentunen | H04L 63/1441 726/23 |
| 2015/0007250 A1 | 1/2015 | Dicato, Jr. et al. | |
| 2015/0049547 A1 | 2/2015 | Kim | |
| 2015/0067839 A1 | 3/2015 | Inardman et al. | |
| 2015/0163242 A1 | 6/2015 | Laidlaw et al. | |
| 2015/0170312 A1 | 6/2015 | Mehta et al. | |
| 2015/0200963 A1 | 7/2015 | Geng et al. | |
| 2015/0220735 A1 | 8/2015 | Paithane et al. | |
| 2015/0295945 A1* | 10/2015 | Canzanese, Jr. | G06F 9/45545 726/23 |
| 2015/0363791 A1 | 12/2015 | Raz et al. | |
| 2015/0381654 A1 | 12/2015 | Wang et al. | |
| 2016/0036837 A1 | 2/2016 | Jain et al. | |
| 2016/0036838 A1 | 2/2016 | Jain et al. | |
| 2016/0044054 A1 | 2/2016 | Stiansen et al. | |
| 2016/0065595 A1 | 3/2016 | Kim et al. | |
| 2016/0112445 A1 | 4/2016 | Abramowitz | |
| 2016/0149943 A1 | 5/2016 | Kaloroumakis et al. | |
| 2016/0191243 A1 | 6/2016 | Manning | |
| 2016/0205123 A1 | 7/2016 | Almurayh et al. | |
| 2016/0261628 A1 | 9/2016 | Doron et al. | |
| 2016/0267179 A1 | 9/2016 | Mei et al. | |
| 2016/0285907 A1 | 9/2016 | Nguyen et al. | |
| 2016/0306974 A1 | 10/2016 | Turgeman et al. | |
| 2017/0034211 A1 | 2/2017 | Buergi et al. | |
| 2017/0142144 A1 | 5/2017 | Weinberger et al. | |
| 2017/0200457 A1 | 7/2017 | Chai et al. | |
| 2017/0230401 A1 | 8/2017 | Ahmed et al. | |
| 2017/0244735 A1 | 8/2017 | Visbal et al. | |
| 2017/0250972 A1 | 8/2017 | Ronda et al. | |
| 2017/0279818 A1 | 9/2017 | Milazzo et al. | |
| 2017/0286544 A1 | 10/2017 | Hunt et al. | |
| 2017/0289187 A1 | 10/2017 | Noel et al. | |
| 2017/0295157 A1 | 10/2017 | Chavez et al. | |
| 2017/0295187 A1 | 10/2017 | Havelka et al. | |
| 2017/0324738 A1 | 11/2017 | Hari et al. | |
| 2018/0012021 A1 | 1/2018 | Volkov | |
| 2018/0012144 A1 | 1/2018 | Ding et al. | |
| 2018/0034779 A1 | 2/2018 | Ahuja et al. | |
| 2018/0063190 A1 | 3/2018 | Wright et al. | |
| 2018/0096153 A1 | 4/2018 | Dewitte et al. | |
| 2018/0115573 A1 | 4/2018 | Kuo et al. | |

FOREIGN PATENT DOCUMENTS

| | | |
|---|---|---|
| CN | 105429956 A | 3/2016 |
| CN | 105897714 A | 8/2016 |
| CN | 106131016 A | 11/2016 |
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| GB | 2493514 A | 2/2013 |
| KR | 10-2007-0049514 A | 5/2007 |
| KR | 10-1514984 B1 | 4/2015 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |

(56) References Cited

FOREIGN PATENT DOCUMENTS

| | | |
|---|---|---|
| RU | 2613535 C1 | 3/2017 |
| RU | 2622870 C2 | 6/2017 |
| RU | 2625050 C1 | 7/2017 |
| RU | 2628192 C2 | 8/2017 |
| RU | 2636702 C1 | 11/2017 |
| RU | 2670906 C9 | 12/2018 |
| WO | 0245380 A2 | 6/2002 |
| WO | 2009/026564 A1 | 2/2009 |
| WO | 2011/045424 A1 | 4/2011 |
| WO | 2012/015171 A2 | 2/2012 |

OTHER PUBLICATIONS

English Abstract of RU129279 retrieved on Espacenet on Sep. 11, 2017.
English Abstract of RU164629 retrieved on Espacenet on Sep. 11, 2017.
English Abstract of RU2538292 retrieved on Espacenet on Sep. 11, 2017.
English Abstract of RU107616 retrieved on Espacenet on Jul. 3, 2017.
European Search Report with regard to EP17180099 completed on Nov. 28, 2017.
European Search Report with regard to EP17191900 completed on Jan. 11, 2018.
Yoshioka et al., "Sandbox Analysis with Controlled Internet Connection for Observing Temporal Changes of Malware Behavior", https://www.researchgate.net/publication/254198606, 15 pages.
Yoshioka et al., "Multi-Pass Malware Sandbox Analysis with Controlled Internet Connection", IEICE Transactions on Fundamentals of Electronics, Communications and Computer Sciences, Engineering Sciences Society, Tokyo, 2010, vol. E93A, No. 1, pp. 210-218.
Wikipedia, "Blockchain", https://en.wikipedia.org/wiki/Blockchain, pdf document, 18 pages.
Search Report with regard to the counterpart RU Patent Application No. 2018101764 completed Jun. 29, 2018.
Search Report with regard to the counterpart RU Patent Application No. 2018101761 completed Jun. 20, 2018.
International Search Report with regard to the counterpart Patent Application No. PCT/RU2016/000526 dated Jun. 1, 2017.
Search Report with regard to the counterpart RU Patent Application No. 2018101760 completed Jun. 22, 2018.
Search Report with regard to the counterpart RU Patent Application No. 2018101759 completed Sep. 7, 2018.
Search Report with regard to the counterpart RU Patent Application No. 2017140501 completed Jul. 11, 2018.
European Search Report with regard to the counterpart EP Patent Application No. EP17211131 completed Apr. 12, 2018.
European Search Report with regard to the counterpart EP Patent Application No. EP17210904 completed May 16, 2018.
Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.
Search Report with regard to the counterpart Patent Application No. RU2018105377 completed Oct. 15, 2018.
Search Report with regard to the counterpart RU Patent Application No. 2018101763 completed Jan. 11, 2019.
Search Report with regard to the counterpart RU Patent Application No. 2016137336 completed Jun. 6, 2017.
English Abstract of RU2522019 retrieved on Espacenet on Jan. 25, 2019.
Office Action with regard to the counterpart U.S. Appl. No. 16/261,854 dated Oct. 21, 2019.
English Translation of CN106713312, © Questel—FAMPAT, Jul. 17, 2019.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion dated Aug. 5, 2019 with regard to the counterpart SG Patent Application No. 10201900339Q.
Invitation to Respond to Written Opinion dated Aug. 5, 2019 with regard to the counterpart SG Patent Application No. 10201901079U.
Invitation to Respond to Written Opinion dated Jul. 31, 2019 with regard to the counterpart SG Patent Application No. 10201900335P.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
Office Action with regard to the counterpart U.S. Appl. No. 15/858,013 dated Nov. 22, 2019.
Search Report with regard to the counterpart SG Patent Application No. 10201900062S dated Dec. 5, 2019.
Search Report with regard to the counterpart SG Patent Application No. 10201900060Y dated Dec. 5, 2019.
English Abstract for CN105429956 retrieved on Espacenet dated Jan. 7, 2020.
English Abstract for CN104504307 retrieved on Espacenet dated Jan. 7, 2020.

* cited by examiner

SYSTEM AND METHOD FOR GENERATING RULES FOR ATTACK DETECTION FEEDBACK SYSTEM

CROSS-REFERENCE

The present application claims convention priority to Russian Utility Patent Application No. 2016137336, filed on Sep. 19, 2016, entitled "СИСТЕМА И СПОСОБ АВТОГЕНЕРАЦИИ РЕШАЮЩИХ ПРАВИЛ ДЛЯ СИСТЕМ ОБНАРУЖЕНИЯ ВТОРЖЕНИЙ С ОБРАТНОЙ СВЯЗЬЮ". This application is incorporated by reference herein in its entirety.

FIELD

The present disclosure relates to computer systems, in particular to systems and methods for attack (intrusion) detection.

BACKGROUND

Because of rapid development of computer hardware and computer networks, it becomes increasingly more pressing to intercept computer attacks (intrusions) and to timely detect malware infections of workstations, mobile devices and servers.

Network-based ADS (Attack Detection Systems) play an important role, since they analyze network traffic to detect network sessions, where infected devices interact with control centers, malware is distributed, or infected devices fall under unauthorized remote control.

Network-based ADS operate with decision rule databases, which comprise a number of criteria used to analyze communication sessions and information security events. These criteria define requirements to the contents and attributes of network connections that are considered malicious by the system, using conventional syntax.

The main practical tasks for network-based ADS are: to timely update of the decision rule database to increase effectiveness of detection of new threats, and to decrease the number of type I errors (false positives).

SUMMARY

The present disclosure is aimed at overcoming the drawbacks of existing solutions.

The objective of the disclosure is to establish a method and system for auto-generation of decision rules for attack detection feedback systems.

An object of the present technology is to increase effectiveness of attack (intrusion) detection.

In accordance with a first broad aspect of the present technology, there is provided a method for auto-generation of decision rules for attack detection feedback systems, the method executed on a server, comprises: receiving at least one event from an event database generated from the data obtained by at least one sensor; analyzing that at least one event received to find out whether it belongs to the class of malware control center interactions; extracting at least one attribute to be used to generate decision rules from at least one event belonging to the class of malware control center interactions; generating decision rules using that at least one attribute extracted; and saving decision rules generated and enabling further updates of decision rules for at least one sensor.

In some embodiments, the attribute extracted from an event is the IP address of the receiver of the data or a domain name extracted from control headings of the transferred data.

In some embodiments, the decision rules generated comprise a combination of at least two of the following:
 domain name system (DNS) query monitoring,
 hypertext transfer protocol (HTTP) query monitoring,
 communication session monitoring, and
 transport layer security (TLS) handshake and certificate monitoring.

In some embodiments, the decision rules generated are saved using a version control system.

In some embodiments, the version control system used is either GIT, SVN, CVS or Mercurial.

In some embodiments, a passively compiled list of DNS queries with replies is additionally received from at least one sensor.

In some embodiments, the decision rules that include HTTP query monitoring are generated using a passively compiled list of DNS queries with replies received from at least one sensor.

In accordance with another broad aspect of the present technology, there is provided a system for auto-generation of decision rules for attack detection feedback systems, comprising the following server-based modules:
 a database module capable of storing data including at least:
  a list of rule IDs (signatures) that detect malware control center interactions, and
  a list of trusted domain names;
  a PassiveDNS, which is a list of DNS queries with replies, passively compiled by sensors;
 a rule repository module capable of receiving and storing a decision rule database, while also supporting data with different versions; and
 a rule generation module capable of:
 receiving events from an event database generated from the data obtained by at least one sensor;
 analyzing events to find out whether they belong to the class of malware control center interactions based on the rule ID list obtained from the database module;
 extracting attributes to be used to generate decision rules from events;
 checking whether the attributes extracted are in the list of trusted domain names obtained from the database module;
 generating decision rules including monitoring of all DNS queries, HTTP queries, communication sessions, TLS handshakes and certificates, which are connected with the attributes extracted;
 sending decision rules generated to the rule repository module so that they can be saved and stored.

BRIEF DESCRIPTION OF THE DRAWINGS

The advantages of the technology will be further pointed out in the detailed description as well as the appended drawings. In the drawings.

In all the figures, arrow lines are used to show that certain objects interact with each other, as well as the direction thereof.

DETAILED DESCRIPTION

The present technology can be implemented on a server or as a machine-readable medium containing the system as described herein or instructions to execute the described method.

This technology can be implemented as a distributed computer system comprising two or more servers connected by communication channels. In terms of the present technology, a server may be a computer system, a computer, a CNC (computer numerical control), a PLC (programmable logic controller), computerized control systems or any other device capable of executing a strictly defined sequence of operations (commands, instructions), receiving data, sending queries and receiving replies from other servers or devices via communication channels.

A command processing device is either an electronic unit or an integral circuit (microprocessor) capable of executing machine-readable instructions (programs).

The command processing device reads machine-readable instructions (programs) from one or more data storage devices, and executes them. A data storage device may be represented by, but not limited to, a hard disk drive (HDD), flash memory, ROM (read-only memory), solid-state drive (SSD), optical drive.

Program, as referred to herein, is a sequence of instructions to be executed by the computer control device or a command processing device.

Malware, as referred to herein, is any software designed to get unauthorized access to computer resources or information stored on a computer in order to exploit those resources or to harm the owner of the information and/or the owner of the computer network by copying, damaging, distorting, deleting or substituting information.

RFC (Request for Comments), as referred to herein, is a document from a series of numbered information documents of the Internet that cover technical specifications and Standards widely used on the Web.

Control center, as referred to herein, (in computer security) comprises servers and other technical infrastructures used to control malware in general, and particularly, botnets.

ADS (attack detection system), as referred to herein, is a system that collects information from various points across the protected computer system (network) and then analyses it to detect both attempted and actual attacks (intrusions).

An exemplary embodiment of the present technology is described below. It should be noted that this example only serves an illustrative purpose and in no way limits the scope of the present technology.

The method for auto-generation of decision rules for attack detection feedback systems.

Figure 1:
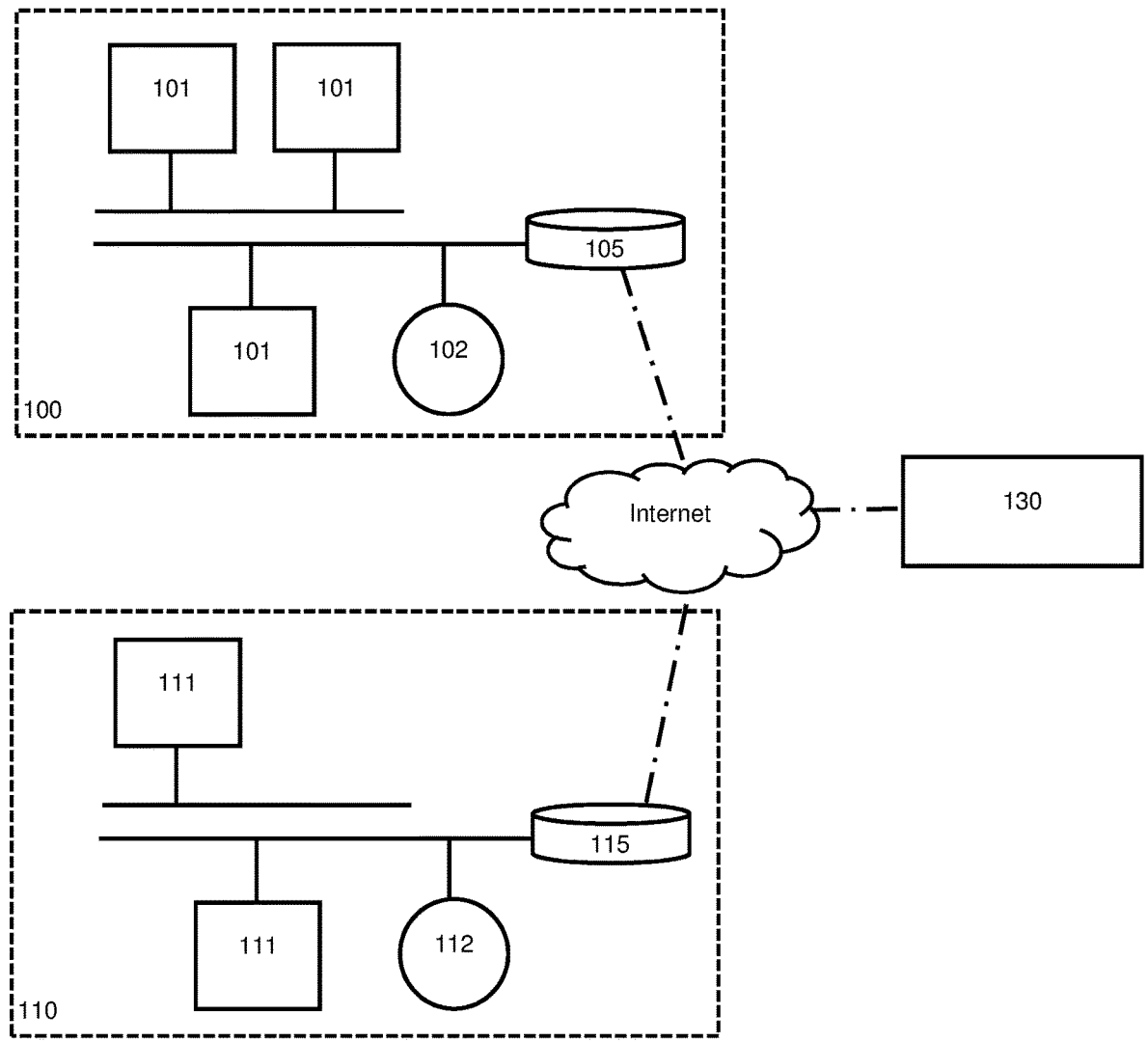
FIG. 1 is a network configuration, in accordance with an embodiment.

FIG. 1 depicts a block diagram of a network with an ADS installed.

The network has several subnets (100 and 110), each having one or more devices (101, 111) capable of accessing the network, such as smartphones, laptops, tablets, desktop PCs, servers or other devices capable of connecting to the network and exchange data. Routers (105, 115) may also be connected to the network.

In order to analyze the network traffic, the network equipment is set-up to mirror data packets transferred and reflect them to a specified port, to which the traffic analysis device (hereinafter called "sensor") is connected.

The sensor (102, 112) monitors the network traffic and analyzes communication session contents to find out whether they contain malicious attributes. The sensor (102, 112) may be a computer or any other device having at least two network interface controllers (NICs), wherein one NIC is used to capture network traffic, while the other is used to control, set up and communicate with a server functioning as a central node (130).

In such system, the central node (130) provides the following functionality:
  protection of the virtual private network for safe interaction between the Center and multiple traffic analysis sensors;
  horizontally distributed storage and processing of events received, including auto-generation of new rules based on the extracted metadata about malicious connections. Thus, information, even if obtained from just a single sensor, is aggregated and centrally accounted when generating new signatures to be delivered to all sensors within the traffic analysis network.

In some embodiments, sensors (102, 112) passively collect information about network events and send it to the central node (130), e.g. information about DNS queries with replies (PassiveDNS).

For instance, rule_1 is triggered on sensor_1. A rule is a set of attributes characteristic for malicious network traffic. Such attributes can be applied to any protocol within the OSI model supported by the ADS. The present technology uses rules operating with the following levels and protocols (according to the OSI model):
  network level: IP, ICMP, etc.;
  transport level: TCP, UDP, SCTP, etc.;
  application level: HTTP, DNS, FTP, SMTP, IRC and other applied protocols.

Rules (signatures) have their own classification, which may differ depending on the ADS in use. For illustrative purposes, below is a rule (signature) classification used by Bot-Trek TDS ADS:
  banking-trojan—rules that detect malware attacking remote banking systems;
  mobile-trojan—rules that detect infected mobile devices and communications with control centers in use;
  backdoor—rules that are triggered when network connections initiated by known programs for remote access to a computer or server are detected;
  apt-trojan—rules that are triggered by network interaction with control centers of trojans used in targeted attacks;
  ek-activity—rules that register interactions with nodes hosting so-called "bundle exploits", i.e. malware sets that allow to remotely exploit vulnerabilities of browsers and their plug-ins;
  botnet-cnc—rules that are triggered by traffic resembling that generated by the C&C (Command&Control Centre) of a botnet;
  dos, ddos—rules that notify of traffic generated by methods known to cause denial of service (e.g. Trin00).

Then, after rule_1 has been triggered, sensor_1 creates event_1 containing at least the following attributes:
  event registering time (event_1);
  a unique ID of the sensor reporting the event (sensor_1);
  a unique ID of the rule triggered (rule_1);
  IP address of the packet source;
  IP address of the packet destination;
  the protocol used to transfer the data;
  control headings of the data packets; and
  a fragment of the malicious packet payload that triggered the rule.

According to the OSI model, higher-level protocols are implemented on the basis of lower-level ones, e.g. the HTTP protocol can be implemented over the TCP protocol, which, in turn, is implemented over the IP protocol. Some of the high-level protocols can be implemented over the UDP protocol or others. Thus, the IP address of the packet source and destination, packet control headings, and the fragment of the malicious packet payload are extracted at the level of TCP/UDP and IP protocols, or other protocols that have such information, or have the current protocol, where the rule has been triggered, imposed over them. Control headings of data packets are data stored in the packet header, according to the RFC of the given protocol.

Then, sensor_1 sends the event_1 to the central node (130), which receives it, analyzes it and stores it in the event database.

Figure 2:
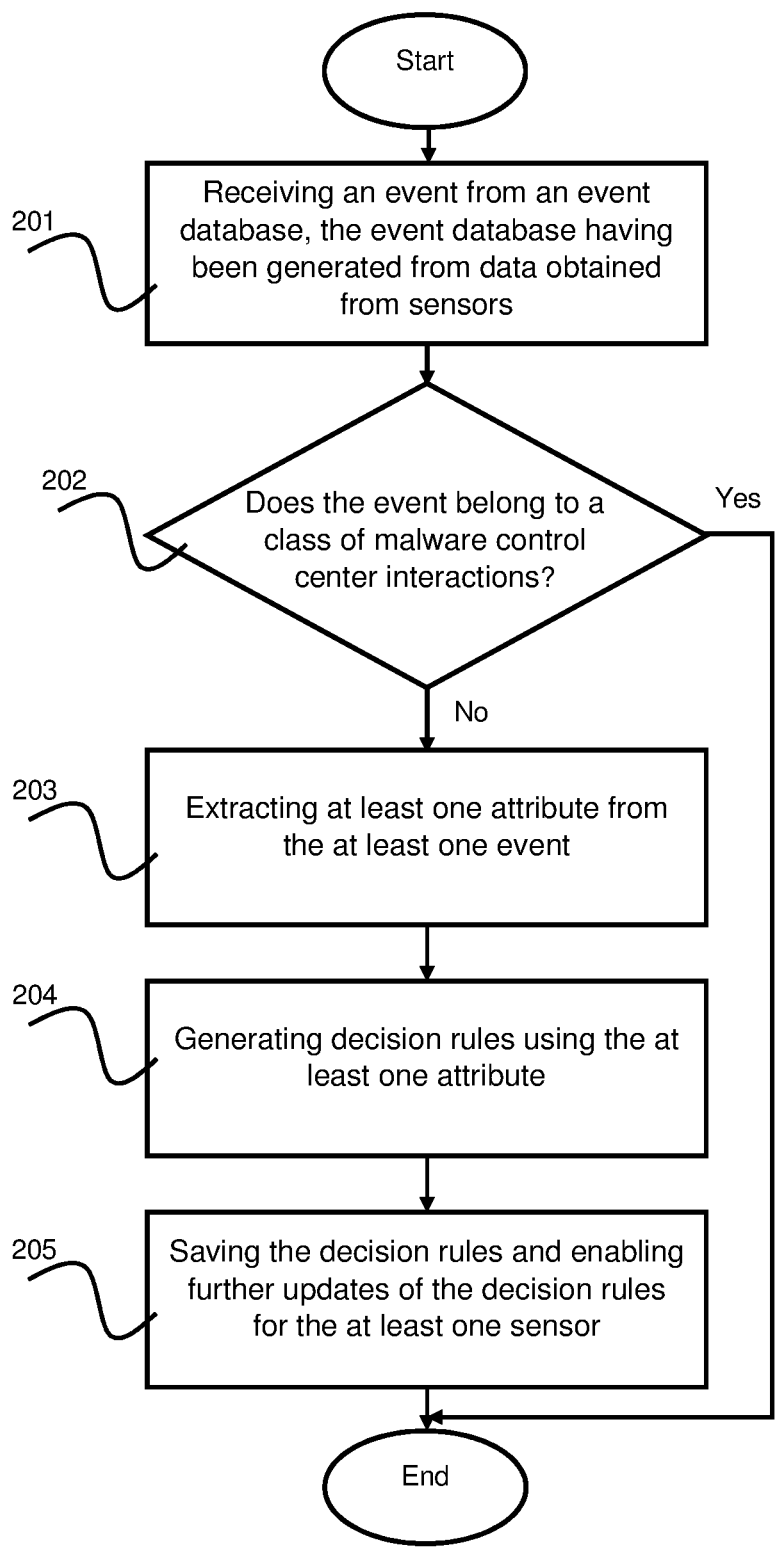
FIG. 2 is a flowchart of the method for auto-generation of decision rules for attack detection feedback systems, in accordance with an embodiment.

FIG. 2 shows a flowchart of the method for auto-generation of decision rules for attack detection feedback systems. The system for auto-generation of decision rules receives the event from the event database (201) and analyzes it to find out whether it belongs to the class of malware control center interactions (202). If the event belongs to this class, then some attributes are extracted therefrom in order to generate decision rules (203). New events may be checked either periodically or using a notification mechanism.

The attributes may include any identifiers that give away the network address of a malware control center or a node under attack, such as the IP address of the data (packet) destination or domain name extracted from control headings of the transferred data (packet). For instance, in the HTTP protocol, the domain name is extracted from the Host header field; in DNS, the domain name is extracted from the binary structure of data transfer according to RFC 1035; and in TLS, the domain name is extracted from the extended "client hello" message (SNI, RFC3546). Generally, attributes are extracted from data structures according to the RFC protocol.

After the attributes have been extracted, the system for auto-generation of decision rules checks whether any of them is in the list of trusted names. If an attribute is in the list, it is not processed at all.

Then, the system generates decision rules (204) (also referred to herein as "rules") including monitoring of all DNS queries, HTTP queries, communication sessions, TLS handshakes and certificates, which are connected with the attributes extracted. The decision rules thus generated may include, but are not limited to the following:

to register all DNS queries addressed to the area connected to the extracted domain name (if any), which allows to detect infected nodes even if the control center (a server in the communications network, used to control the network of infected devices and to mine information) is inactive, wherein the infection is detected in the DNS service traffic: domain name resolution is possible even if the control center or domain name removed from delegation is inactive;

to register all HTTP queries addressed to the extracted domain name (if any);

to register all TLS handshakes and certificates connected to the extracted domain name (if any), wherein this domain name is searched for in the traffic related to establishing TLS connections (TLS handshakes) and the server certificate. This rule allows detecting threats that use TLS to encrypt control center interactions in the network. In some embodiments, the SNI (Server Name Indication) extension for the TLS protocol is used, which enables clients to tell the name of the host they are going to connect, during the handshake, usually as a server_name field in the query;

to register all communication sessions connected to the extracted IP address;

to register all HTTP queries addressed to domain names that have an A-/AAAA-entry containing the extracted IP address. The A entry (address record) attributes the host name to the IPv4 address, e.g. the A-entry query addressed to referrals.icann.org will return its IPv4 address—192.0.34.164; the AAAA entry (IPv6 address record) attributes the host name to the IPv6 address, e.g. the AAAA-entry query addressed to K.ROOT-SERVERS.NET will return its IPv6 address—2001:7fd::1.

In some embodiments, when the rule to register all HTTP queries addressed to domain names that have an A-/AAAA-entry containing the extracted IP address is generated, a PassiveDNS—a list of DNS queries with replies, passively compiled by sensors—can be used, wherein the list of DNS queries with replies is analyzed to find out whether they include entries containing A-/AAAA-entries with extracted IP addresses, which allows to track the traffic directed at domain names that have been undelegated or are currently unavailable.

Then, the system saves and stores the generated decision rules (205). Decision rules may be stored in the database or as files. In some embodiments, in order to support different revisions and enable rollbacks, the generated rules are stored using version control systems. In some embodiments, such systems are distributed. The existing ones include, but are not limited to SVN, Mercurial, GIT.

Finally, the system makes the decision rules available for sensor updates.

Traffic analysis sensors cyclically run checks for available updates on the central node and use them, if there are any. After an update has been obtained, the sensor refreshes its decision rules, which is triggered in some embodiments by the USR2 signal (a user signal used for inter-process synchronization and control).

After new decision rules have been generated and applied, attack detection systems begin to register more events related to detected malicious indicators, which allows to discover more infection paths and domain names used, as well as to detect malware (or its modules) that could not be detected using the previous set of rules.

Figure 3:
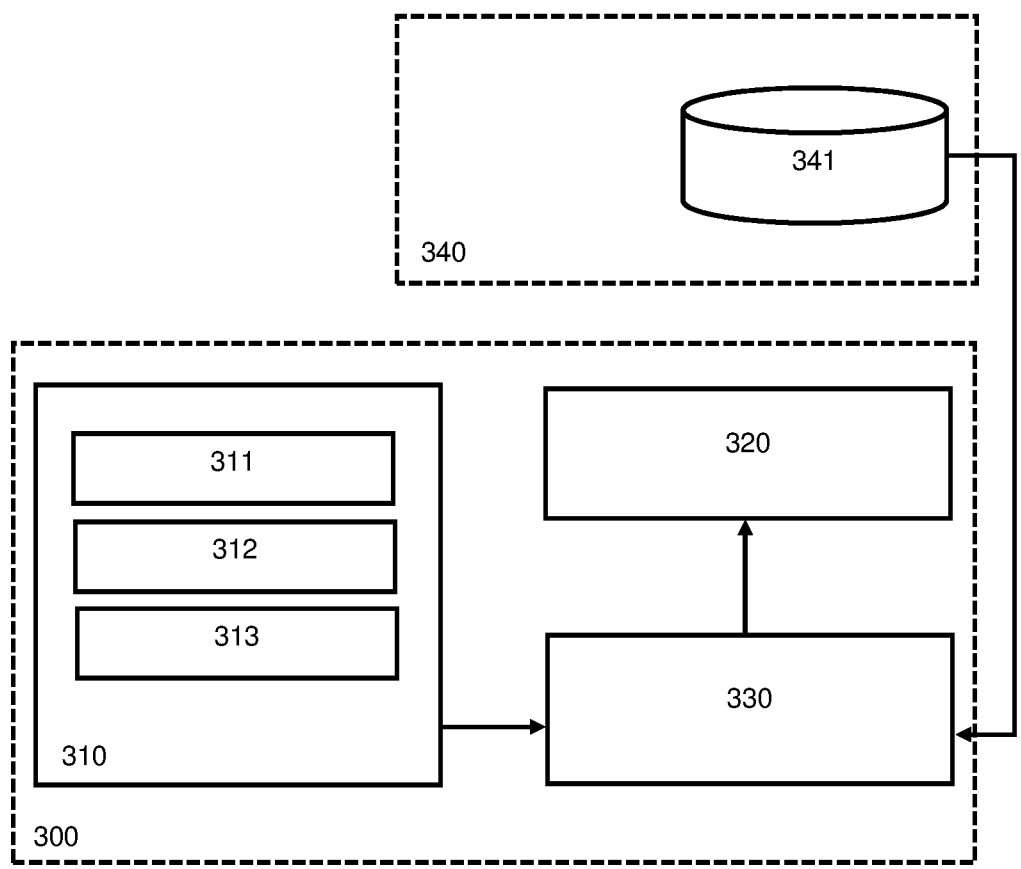
FIG. 3 is a system for auto-generation of decision rules for attack detection feedback systems, in accordance with an embodiment of the present technology.

FIG. 3 shows a system for auto-generation of decision rules which comprises the following server-based modules: a rule generation module (310), a rule repository module (320) and a rule generation module (330).

The rule generation module (310) is configured to store data used to generate feedback to adjust the set of decision rules based on traffic analysis rule triggers. The database includes at least the following data: a list of rule IDs (signatures) (311), a list of trusted domain names (312), and passivedns (313).

The list of rule IDs (signatures) (311) detects malware control center interactions. This list is a subset of all rule IDs and is managed by the administrator of the system.

The list of trusted domain names (312) can be added to by an operator of the system, while the original list can be uploaded from a public source, such as ALEXA rating.

Passivedns (313) is a list of DNS queries with replies, passively compiled by sensors, that allows to retrieve the list of domain names by an IP address, wherein the names have (or had) an A-/AAAA/MX entry corresponding to the given IP address.

The rule repository module (320) is configured to store a decision rule database, while also supporting data with different versions. Decision rules may be stored in files and/or the database. In some embodiments, in order to support different revisions and enable rollbacks, the generated rules are stored using version control systems. In some embodiments, such systems are distributed. The existing ones include, but are not limited to SVN, Mercurial, GIT.

The rule generation module (330) is configured to analyze events obtained from sensors and generate new decision rules. The rule generation module (330) receives at least one event from the event database (341) at the central node (340), previously obtained from at least one sensor and analyzes it to find out whether it belongs to the class of malware control center interactions based on the rule ID list from the database module (311). If an event belongs to this class, then the module (330) extracts at least one attribute therefrom in order to use it to generate decision rules. Such attributes may include any identifiers that give away the network address of a malware control center or a node under attack, for example, the IP address of the data (packet) destination or domain name extracted from control headings of the transferred data (packet). For instance, in the HTTP protocol, the domain name is extracted from the Host header field. For instance, in DNS, the domain name is extracted from the binary structure of data transfer according to RFC 1035. For instance, in TLS, the domain name is extracted from the "client hello" message containing the SNI extension.

After the attributes have been extracted, the rule generation module checks whether any of them is in the list of trusted names (312). If an attribute is in the list, it is not processed any further.

Then, the rule generation module generates decision rules including monitoring of all DNS queries, HTTP queries, communication sessions, TLS handshakes and certificates, which are connected with the attributes extracted. The decision rules thus generated may include, but are not limited to, the following:
- to register all DNS queries addressed to the area connected to the extracted domain name (if any), wherein the infection is detected in the DNS service traffic: domain name resolution is possible even if the control center or domain name removed from delegation is inactive;
- to register all HTTP queries addressed to the extracted domain name (if any);
- to register all TLS handshakes and certificates connected to the extracted domain name (if any), wherein this domain name is searched for in the traffic related to establishing TLS connections (TLS handshakes) and the server certificate;
- to register all communication sessions connected to the extracted IP address; and
- to register all HTTP queries addressed to domain names that have an A-/AAAA-entry containing the extracted IP address.

Finally, the rule generation module (330) sends the decision rules generated to the rule repository module (330), so that they are saved and stored, after which they become available for sensor updates.

Having thus described the technology, it should be apparent to those skilled in the art that certain advantages of the described system and method have been achieved. It is to be understood that the detailed description of the technology and examples cited are exemplary and explanatory to provide, without restriction, further explanation of the technology as claimed.

It should also be appreciated that various modifications, adaptations, and alternative embodiments thereof may be made within the scope and spirit of the present technology. The technology is further defined by the following claims.

What is claimed, is:

1. A method for auto-generation of decision rules for attack detection feedback systems, the method executable on a server, the method comprising:
   receiving at least one event from an event database, the at least one event having been generated from data obtained by at least one of a plurality of sensors in response to a given decision rule having been triggered on the at least one of the plurality of sensors and being associated therewith;
   the data being representative of network traffic;
   the given decision rule including at least one malicious attribute indicative of at least one malware control center interaction associated with a given malware control center, the given decision rule having been triggered by virtue of the at least one malicious attribute being present in the data;
   the at least one malware control center interaction associated with the given malware control center and belonging to a given class of malware control center interactions;
   analyzing the at least one event to determine whether the at least one event belongs to the given class of malware control center interactions;
   if the at least one event belongs to the given class of malware control center interactions, extracting at least one new attribute from the at least one event, the at least one new attribute being different from the at least one malicious attribute associated with the given decision rule;
   generating at least one new decision rule using the at least one new attribute;
   transmitting the at least one new decision rule to each of the plurality of sensors; and
   causing each one of the plurality of sensors to use the at least one new decision rule to detect at least one new malware control center interaction associated with the given malware control center and belonging to the given class of malware control center interactions;
   wherein the at least one new decision rule comprises at least two of a domain name system (DNS) query monitoring, an hypertext transfer protocol (HTTP) query monitoring, a communication session monitoring, and a transport layer security (TLS) handshake and certificate monitoring.

2. The method of claim 1, wherein the at least one new attribute is at least one of an internet protocol (IP) address of a receiver of the data and a domain name extracted from control headings of the data being transferred.

3. The method of claim 1, wherein the at least one new decision rule is saved using a version control system.

4. The method of claim 3, wherein the version control system is GU, SVN, CVS or Mercurial.

5. The method of claim 1, further comprising receiving, from the at least one of the plurality of sensors, a passively compiled list of DNS queries with replies.

6. The method of claim 1, wherein the at least one new decision rule, that includes HTTP query monitoring, is generated using a passively compiled list of DNS queries with replies received from the at least one of the plurality of sensors.

7. The method of claim 5, wherein the at least one new decision rule, that includes HTTP query monitoring, are generated using a passively compiled list of DNS queries with replies received from the at least one of the plurality of sensors.

8. The method of claim 1, further comprising generating the event database.

9. The method of claim 1, further comprising updating the at least one new decision rule based on further data obtained by any one of the plurality of sensors.

10. The method of claim 1, further comprising periodically updating the at least one new decision rule.

11. The method of claim 1, wherein the periodically updating the at least one new decision rule is executed based on additional data sensed by any one of the plurality of sensors.

12. The method of claim 1, wherein the at least one new decision rule is used in addition to the given decision rule.

13. The method of claim 1, wherein the at least one new decision rule is for identifying malware control center interactions not identifiable by the given decision rule.

14. A system for auto-generation of decision rules for attack detection feedback systems, the system comprising a hardware server, the hardware server running a database configured, by the hardware server, to store data, the data comprising:
   a list of rule IDs for detecting malware control center interactions;
   a list of trusted domain names; and
   a passiveDNS, the passiveDNS being a list of DNS queries with replies, passively compiled by a plurality of sensors;
a decision rule database; and
the hardware server being configured to:
receive at least one event from the database, the at least one event having been generated from network data obtained by at least one of the plurality of sensors in response to a given decision rule having been triggered on the at least one of the plurality of sensors and being associated therewith;
   the network data being representative of network traffic;
   the given decision rule including at least one malicious attribute indicative of at least one malware control center interaction associated with a given malware control center, the given decision rule having been triggered by virtue of the at least one malicious attribute being present in the data;
   the at least one malware control center interaction associated with the given malware control center and belonging to a given class of malware control center interactions;
analyze the at least one event to determine whether the at least one event belongs to the given class of malware control center interactions based on the rule ID list obtained from the database;
if the at least one event belongs to the given class of malware control center interactions, extract at least one new attribute from the at least one event, the at least one new attribute being different from the at least one malicious attribute associated with the given decision rule;
determine whether the at least one new attribute is in the list of trusted domain names obtained from the database;
generate at least one new decision rule, the at least one new decision rule comprising monitoring DNS queries, HTTP queries, communication sessions, TLS handshakes and certificates, which are related to the at least one extracted attribute;
transmit the at least one new decision rule to each of the plurality of sensors; and
cause each one of the plurality of sensors to use the at least one new decision rule to detect at least one new malware control center interaction associated with the given malware control center and belonging to the given class of malware control center interactions.

* * * * *